United States Patent [19]

Kaser et al.

[11] Patent Number: 4,975,099
[45] Date of Patent: Dec. 4, 1990

[54] REGENERATABLE PARTICLE FILTER FOR WASTE GASES

[75] Inventors: Arthur Kaser, Steinhaus; Ulf Pfeifer, Wien, both of Austria

[73] Assignee: Voest-Alpine Automotive Gesellschaft M.B.H., Linz, Austria

[21] Appl. No.: 436,334

[22] Filed: Nov. 14, 1989

[30] Foreign Application Priority Data

Nov. 14, 1988 [DE] Fed. Rep. of Germany ....... 3838589

[51] Int. Cl.$^5$ ............................................. B01D 46/04
[52] U.S. Cl. ........................................ 55/267; 55/242; 55/523; 55/DIG. 30; 60/303; 60/311
[58] Field of Search ................. 55/208, 267, 282, 243, 55/523, DIG. 30; 60/246, 303, 311

[56] References Cited

U.S. PATENT DOCUMENTS 4,872,849  10/1989  Lepperhoff et al. ................... 55/267
4,897,096   1/1990  Pischinger et al. .................... 55/283

Primary Examiner—Charles Hart
Attorney, Agent, or Firm—Thomas R. Vigil

[57] ABSTRACT

The particle filter for waste gases includes a porous filter body traversed by honeycomb-form channels and resistance heating elements for burning-off of soot particles. The resistance heating elements are in a zone adjacent an entry end of the filter body and include perforated strips of sheet metal including longitudinal strips which are bent into U-shaped heat conductors. Cross strips create, on destruction of individual heat conductors, an electrical current detour path. The resistance heating elements are inexpensive to produce and easy to install.

12 Claims, 3 Drawing Sheets

REGENERATABLE PARTICLE FILTER FOR WASTE GASES

BACKGROUND OF THE INVENTION

1. Field of the Invention

The present invention relates to a filter for removing soot particles from waste gases using a filter body of porous material traversed by filter passages arranged in honeycomb form, and in the zone of the entry openings of the filter passages that open on the gas entry side of the filter there are arranged at least two resistance heating elements forming heating zones for heating the adjoining zones of the face surface of the filter body.

These resistance heating elements are connected from time to time individually or in common with a current source, in order to, in cooperation with gases flowing through the filter body, burn off soot particles accumulated on the walls of the passages.

2. Description of the related art including information disclosed under 37 CFR §§ 1.97–1.99

A filter similar to the filter disclosed herein is known from W. German published patent specification DE-OS 37 12 333. In this patent publication the resistance heating elements forming the individual heating zones are wires laid in a harp pattern or a meandering pattern on the face surface of the filter body, which form wire loops plunging over or projecting into the entry openings of the filter passages into filter passages. By its nature, the cross section of a wire is constant over its length, whereby the same amount of heat is liberated over its entire length. Thereby the wire heats up also where it should not or must not.

Furthermore, the length and cross section of the wire must be attuned to one another for the achieving the ignition temperature, and, as a result, there is no freedom in design of the disposition and dimensioning of the heating elements and the heating zones. Additionally, the laying of the thin wires with their loops on the face surface of the filter body as well as their connecting with the outward-leading current lines in the fabrication of the resistance heating element is an extremely difficult and time-consuming operation.

As will be described in greater detail hereafter, it is the aim of the present invention to create resistance heating elements which allow freedom of design in the heating zone which are simultaneously inexpensive to manufacture and to install, and are dependable and long-lived.

SUMMARY OF THE PRESENT INVENTION

In the filter of the present invention the aim of the invention is achieved by providing resistance heating elements which are perforated sheet metal strips extending in their length and in their width over the entire heating zone, which form a grid consisting of transverse (cross) fillets or strips and longitudinal fillets or strips, and in which the longitudinal fillets are bent into U-shaped heat conductors which extend into open filter passages of the filter.

In this way, for each heating zone there is provided an inexpensive sturdy part which is suited for mass production and which is easily installable. Since the heating elements form two-dimensional grids, the electric current, on destruction of a U-shaped heat conductor, is rerouted through the grid, so that the entire heating zone remains substantially functional.

Further, in this way it is possible to attune the individual conductor line cross sections in such a way that only the narrow longitudinal fillets or strips are heated red-hot, while the others touching the filter body, however, are heated less, which increases the life of the resistance element and the filter body.

Since a two-dimensional grid with individually formable cross sections is provided, this grid can be adapted to the chosen size and form (with round cross section of the filter body) for the individual heating zones.

All these advantages stand out still more strongly when, in a further development of the invention, the heat conductor is formed in such a way that the fillets or strips lie in the direction of the diagonals of the filter channels, arranged in the manner of a chessboard.

Thereby the connecting cross sections can be made larger without hampering the gas flow. Additionally, the rigidity of the whole resistance heating element is increased.

For further improving the rigidity, in a further development of the invention, it is proposed that the individual U-shaped heat conductors be stiffened by bending about their longitudinal axes, whereby also the danger of vibrations caused by flow decreases. If they are bent in such a way that their side borders come close to the inner walls of the gas entry channels, soot deposits can be ignited directly by contact.

By constriction of the U-shaped heating conductors at certain places it is possible to optimize the position of highest temperature and thereby the burn-off behavior.

According to a modification of the invention, with a diagonal arrangement of the resistance heating elements it is possible to use these also for covering the open passages on the gas/exit side of the filter, whereby not only the plugging of these passages with a ceramic composition becomes superfluous, but also the heat conductor is pressed against the face surface of the filter body by the pressure difference existing between the channels (which corresponds, after all, to the pressure loss of the filter).

In a still further development of the invention it is proposed that the face-side ends of the resistance heating elements be constructed as contact tongues leading out of the filter casing, whereby line conductor connections in the interior of the filter are avoided. In particular, the ground connection can be formed especially simply by having the ground tongues led either directly to the connecting flange or bent away from the face surface of the filter body and brought into contact with a ground conductor which is connected with the casing flange, depending on the disposition of the heating zones. If, finally, the heating zones are arranged in such a way that all the ground tongues lie in one line, then a single narrow strip of metal serves as a ground connection.

DESCRIPTION OF THE PREFERRED EMBODIMENTS

Figure 1:
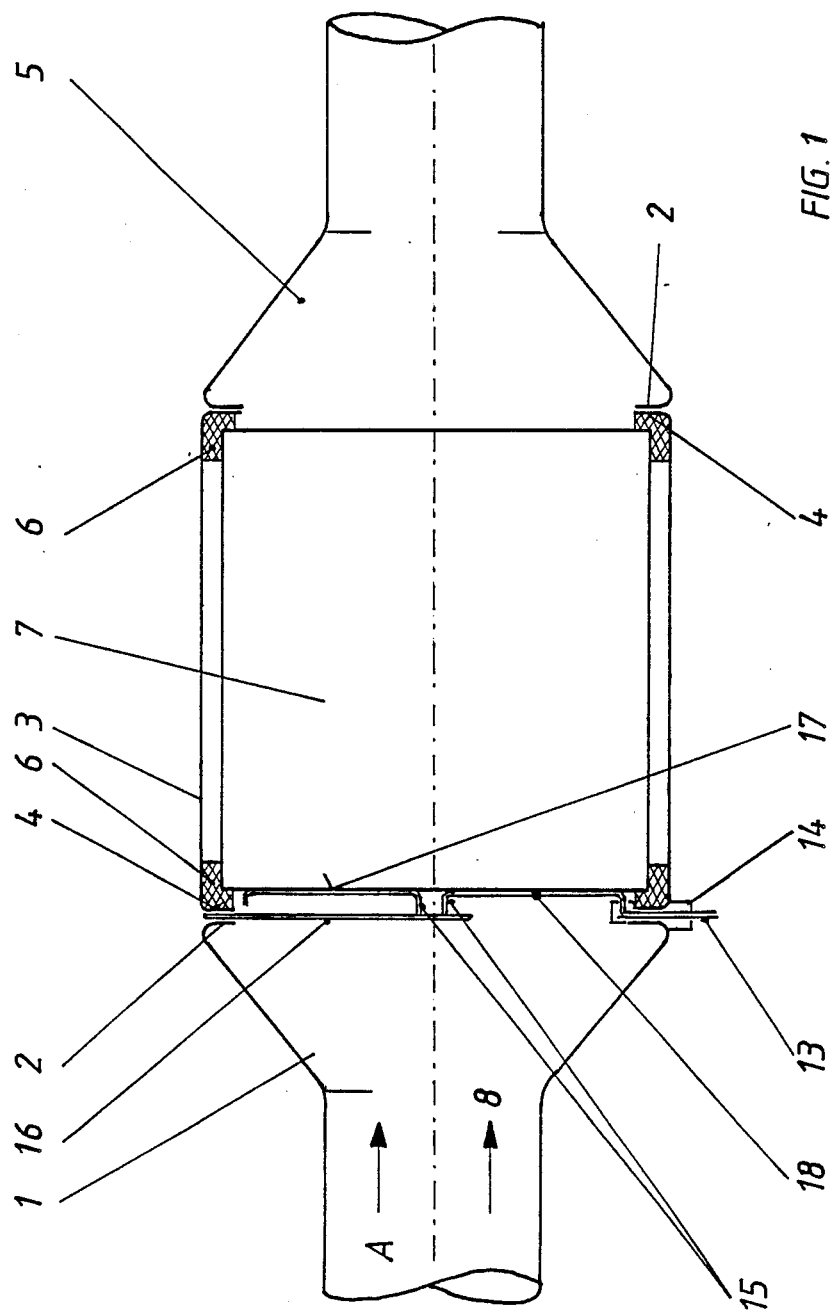
FIG. 1 is a longitudinal sectional view of a particle filter constructed according to the teachings of the present invention.

FIG. 1 shows a particle filter constructed according to the teachings of the present invention and including a casing formed by an inflow cone 1, a shell 3 and an outflow cone 5 and a ceramic filter body 7 disposed within the shell 3 and having passages to be described hereinafter and resistance heating elements 18 arranged upstream of the filter body 7.

The inflow cone 1 and the exit cone 5 are solidly joined in a suitable manner over flanges 2 to the flanges 4 of the shell 3. The flanges 2, 4 are bent inward in the embodiment shown, but they can just as well be bent outward or welded on and joined with one another, by screws, flanges, soldering or welding.

Figure 5:
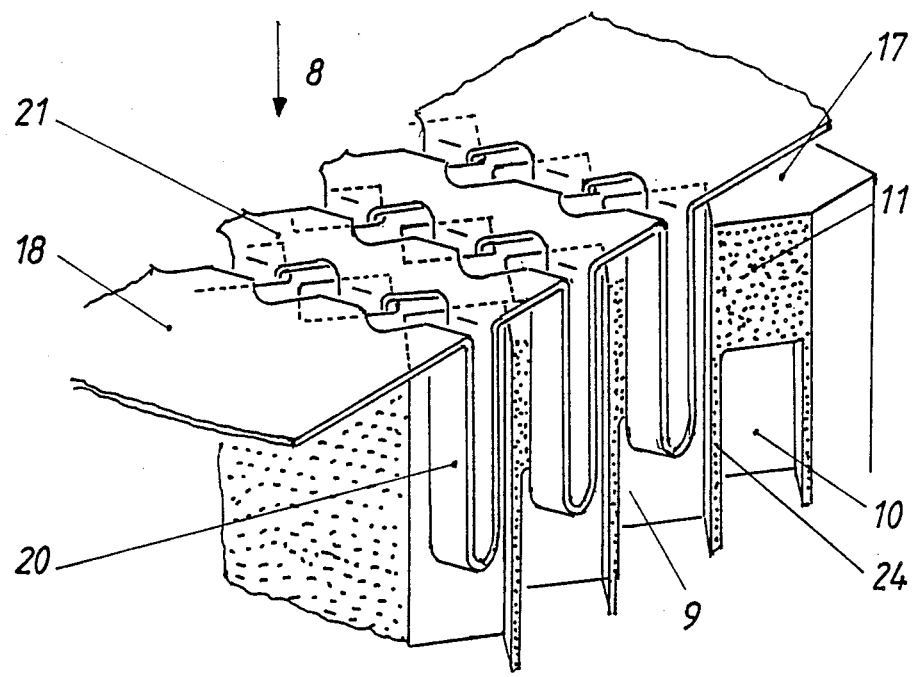
FIG. 5 is a fragmentary perspective view with portions cut away of the structure shown in FIG. 3 with the axial direction of the gas flow indicated by the arrow 8 in FIG. 1 also shown in FIG. 5.

In the interior of the shell 3 the filter body 7 is held fast axially and radially, for example by packing rings 6. The filter body 7 comprises a porous material, such as ceramic, and contains longitudinally directed entry channels 9 (FIG. 2) arranged in the manner of a chessboard, and exit channels 10, as best seen in FIG. 5. The gas to be purified flows into the entry channels 9 open in front in the flow direction indicated by the arrow 8, passes through the porous partitions 24 and leaves the filter body 7 through the exit channels 10 open to the rear.

Figure 2:
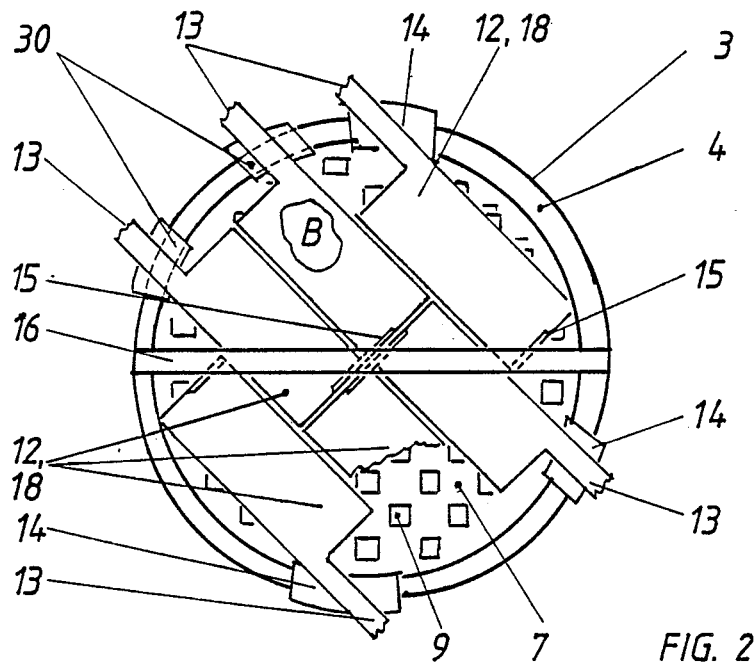
FIG. 2 is an end view of the filter viewing same in the direction indicated by the arrow A in FIG. 1.

FIG. 2 is a side view of the filter with entry cone 1 removed in flow direction 8. There and in FIG. 1 it is to be perceived that on the face surface 17 there lie several resistance heating elements 18 which form the zones 12. The individual resistance heating elements 18 can be placed under current individually, whereby they selectively initiate the burning off of the soot accumulated in the entry channels 9.

The resistance heating elements 18 form contact tongues 13, which are led out through insulators 14 between the flange connections 2, 4 from the filter casing, for which purpose parts 30 of the flanges can be lifted off to make room for the insulators 14.

The other ends of the resistance heating elements 18 run out, in the illustrated embodiment, in upward-bent ground tongues 15 which touch a ground conductor 16, which is a sheet metal strip held between the flanges 2, 4. It stands in conductive connection with the flanges 2, 4, whereby one side of the resistance heating elements 18 is connected with the casing 1, 3, 5 and therewith with ground.

In FIG. 2 the zones 12 are arranged in such a way that all the ground tongues 15 touch the ground conductor 16. It will be understood, however, that the resistance heating elements 18 can be arranged as desired, in which context, with relinquishment of the ground conductor 16 the ground tongues 15 can also be guided individually to the flange 2, 4. The special formation of the resistance heating element 18 provides the precondition for this guiding.

Figure 4:
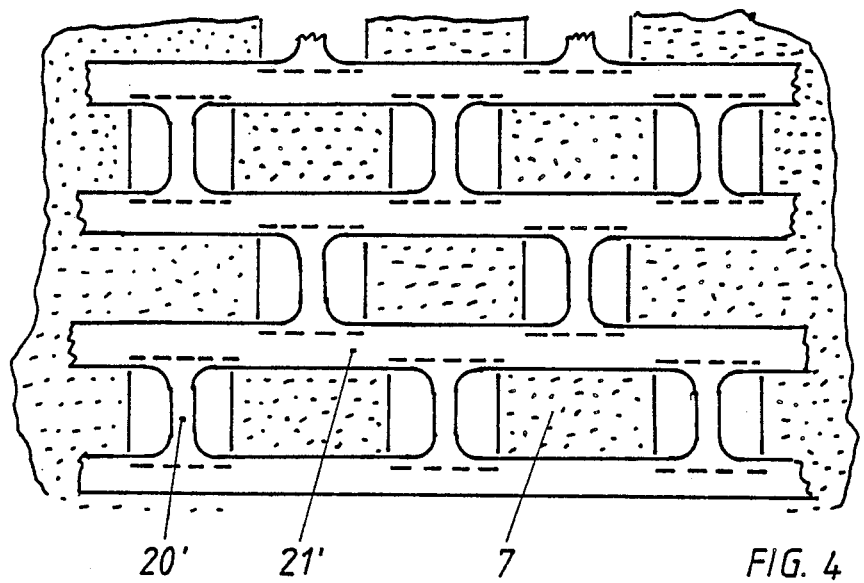
FIG. 4 is a variation of the area B shown in FIG. 3.
Figure 3:
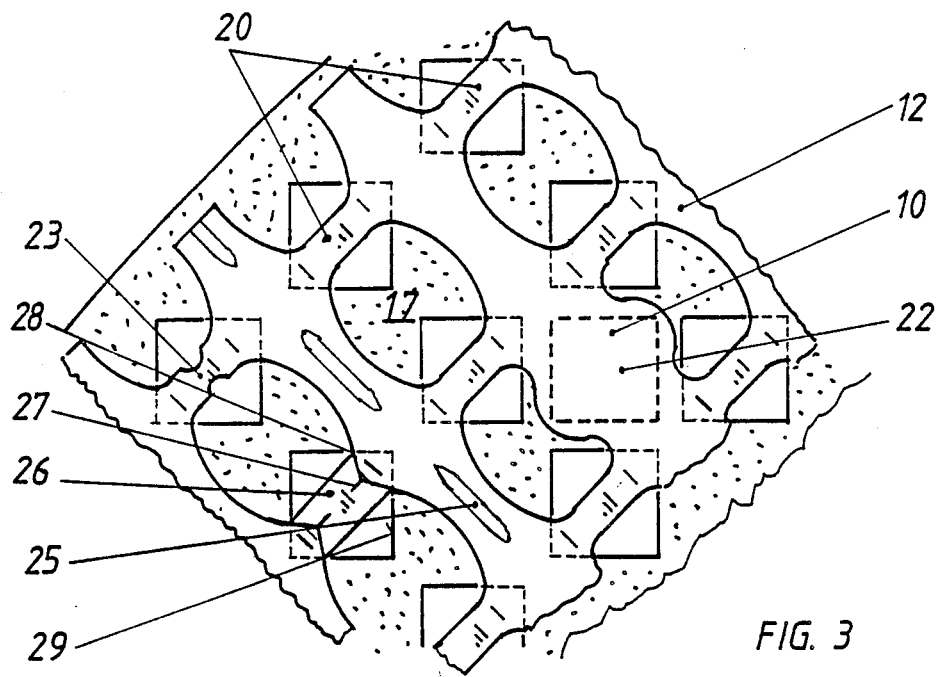
FIG. 3 is an enlarged view of the area B of the zone 12 in FIG. 2 turned through 90°.

In FIGS. 3 and 4 two different formations or embodiments of the resistance heating elements 18 are represented, much enlarged. Both variants have in common the feature that the resistance heating elements 18 are metal strips which are stamped out in such a way that they form longitudinal fillets or strips 20 serving as heat conductors and cross strips 21 connecting the fillets 20. The longitudinal strips 20 are bent in U-shape, so that they plunge or project into the entry channels 9 of the filter body 7.

The resistance heating elements 18 can be made rapidly and accurately with simple stamping or pressing tools. In the production by pressing it is possible, without added expenditure, to increase the rigidity of the resistance heating elements 18 by formation of corrugations 25 (FIG. 3) in the cross strips 21 or bending of the heat conductors 26, also in longitudinal direction. When the side edges 28 come close to the inner walls 29 of the gas entry channels 9, soot deposits can be ignited directly.

In FIGS. 3 and 4 it is to be perceived that the filter body 7 has entry channels 9 arranged in the manner of a chessboard, which are open toward its face surface 17 and into which there flow the waste gases laden with particles. The exit channels 10 are closed with respect to the face surface 17, normally by a ceramic plug 11.

In the embodiment of FIG. 3 the fillets 20, 21 of the resistance heating element 18 are arranged on the face surface 17 in the direction of the diagonals of the chessboard. The electric current flows here parallel through several longitudinal fillets 20. If one of these longitudinal fillets is destroyed, the electric current bypasses this trouble spot using the cross strips 21. The resistance heating element 18, substantially functional, remains.

Furthermore, in FIG. 3 two modifications are recognizable. If one wants to save the ceramic plug 11, the cross strips 21 are broadened into tabs 22 which prevent the gases from entering the exit channels 10 and are even pressed by the prevailing pressure difference onto the face surface 17 of the filter body 7. In a similar manner also the entry channels 9 can be plugged at the rear, which is not represented in FIG. 3.

For the exact adaptation of the resistance to flow conditions and to the form and size of the resistance heating element 18, but also for the influencing of the burn-off behavior, it is possible to provide individual ones or all of the heat conductors 20 with constrictions 23 at which, then, the current density and therefore the temperature is higher.

FIG. 4 differs from FIG. 3 only in that the longitudinal fillets 20' and transverse fillets 21' are aligned not diagonally, but in the direction of the chessboard. Here, too, it is possible, similarly as in FIG. 3, to arrange tabs 22 or constrictions 23 with the same effect.

FIG. 5 shows the resistance heating element 18 according to FIG. 3 and a small part of the filter body 7 cut open in an axionometric view. The heat conductors 20 plunge into the entry channels 9, the waste gas passes from these channels 9 through the ceramic wall 19, in which process the soot carried along is deposited, and into the exit channels 10 which are closed by a ceramic plug 11 opposite the face surface 17.

Through the construction of the resistance elements 18 and filter body 7 according to the teachings of the present invention, also the assembling of the particle filters becomes especially simple and economical in labor. The individual resistance elements 18 can be emplaced without problems on the filter body 7 packed in the casing 6, in which operation the contact tongues 13 and the insulators 14 overhang the shell flange 4.

The entry cone 1 is then emplaced and joined with the flange 4.

Various constructions of the flanges 2, 4 and their connection by screwing, flanging, welding, can be employed. Correspondingly, also the tongues 13, 15 can be constructed in a manner familiar to the artisan and be brought up either joined or isolated between the flanges 2, 4.

Further modifications of the embodiments depicted herein are possible without departing from the teachings of the invention. For example, the face surface of the filter body can also be rectangular and the individual resistance heating elements can be constructed in such a way that their face surface can be largely occupied It is even conceivable to combine several filter bodies together.

Altogether, through the formation of the resistance heating elements according to the teachings of the present invention, not only are the problems posed solved, but also they are solved in a way which enables mass production of such filters.

We claim:

1. A filter for removing soot particles from waste gases, including a filter body of porous material traversed by filter channels arranged in honeycomb pattern, the zone of the entry openings of the filter channels opening on a gas-entry side of the filter body and having at least two resistance heating elements forming heating zones for adjoining zones of a face surface of the filter body, said resistance heating element being a perforated sheet metal strip which extends in their length and in their width over the entire heating zone which form a grid consisting of longitudinal strips and cross strips, said longitudinal strips being bent into U-shaped heat conductors which extend into the open filter channels.

2. The filter of claim 1 wherein said heat conductors, in addition to the U-shaped bending, are also bent about their longitudinal axes.

3. The filter of claim 2, wherein said heat conductors are bent about their longitudinal axes in such a way that their side edges come close to the inner walls of the entry channels or touch the inner walls.

4. The filter of claim 1, wherein said filter channels have a square cross section and are arranged in the manner of a chessboard, and wherein the longitudinal strips and cross strips lie in the direction of the diagonals of the chessboard.

5. The filter of to claim 4, characterized in that the strips bent into the U-shaped heat conductors have one or more constrictions.

6. The filter of claim 4, wherein said cross strips cover the exit channels of the filter body.

7. The filter of claim 1, wherein at least one face-side end of each resistance heating element is constructed as a contact tongue which is led out from a filter casing.

8. The filter of claim 7, wherein at least one contact tongue of each resistance heating element is led out through a connecting flange.

9. The filter of claim 8, wherein at least one of the flanges presents corrugations at the lead-through places of the contact tongues.

10. The filter of claim 7, wherein said other face-side ends of each resistance heating element are constructed as ground tongues, which are led to a casing flange and joined conductively with the casing flange.

11. The filter of claim 7, wherein said other face-side ends of each resistance heating element are constructed as ground tongues which are bent away from the face surface of the filter body and touch a ground conductor arranged upstream of the face surface, said ground conductor standing conductively in connection with the casing flange.

12. The filter of claim 9, wherein several resistance heating elements are arranged on the face surface of the filter body in such a way that their contact tongues lie on the outer edge of the filter body and their ground tongues end approximately in a line in which the ground conductor lies and touch a conductor situated on this line.

* * * * *